United States Patent
Anderson et al.

(10) Patent No.: US 6,361,122 B2
(45) Date of Patent: *Mar. 26, 2002

(54) PEDAL ASSEMBLIES FOR VEHICLE BRAKING SYSTEMS

(75) Inventors: Robert Alan Anderson, West Midlands; Stephen Donald Crisp, Birmingham; Barry John Bridgens, West Midlands; Michael James Ayres, Coventry, all of (GB)

(73) Assignee: Lucas Industries public limited company, West Midlands (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/842,159

(22) Filed: Apr. 23, 1997

(51) Int. Cl.[7] ................................................ B60T 11/20
(52) U.S. Cl. ........................... 303/3; 303/113.4; 60/562
(58) Field of Search .......................... 303/113.4, 114.1, 303/3, 15; 267/141

(56) References Cited

U.S. PATENT DOCUMENTS

| | | | | | |
|---|---|---|---|---|---|
| 3,318,575 A | * | 5/1967 | Hawkins | ...................... | 267/141 |
| 5,106,167 A | * | 4/1992 | Matsuda | ...................... | 363/15 |
| 5,496,098 A | * | 3/1996 | Brearley | ...................... | 303/22.2 |
| 5,603,217 A | * | 2/1997 | Majersik | ...................... | 60/562 |

* cited by examiner

*Primary Examiner*—Matthew C. Graham
(74) *Attorney, Agent, or Firm*—Michael Best & Friedrich LLC; Laff, Whitesel & Saret, Ltd.; J. Warren Whitesel

(57) ABSTRACT

In a pedal assembly for a brake-by-wire vehicle braking system, feedback reaction means (10) is provided so that feedback to the driver through the pedal (3) provides comfortable feel, similar to the pedal feel achieved in a conventional hydraulic braking system fitted to a non-EBS equipped vehicle. The feedback reaction means may comprise a two-rate spring assembly (24, 26) or a variable rate spring assembly, in combination with a damper (40).

4 Claims, 8 Drawing Sheets

PEDAL ASSEMBLIES FOR VEHICLE BRAKING SYSTEMS

This invention relates to pedal assemblies for vehicle braking systems of the brake-by-wire type of the kind in which operation of a brake pedal is adapted to cause actuation of the brakes of a vehicle fitted with an Electronic Braking System (EBS).

In an EBS for a vehicle there is usually only an electrical connection between the brake pedal and an Electronic Control Unit (ECU) which is adapted to control the braking system in accordance with the signals received from the pedal assembly. Usually the pedal assembly is provided with a displacement transducer, normally a potentiometer, adapted to produce a varying electrical output proportional to the driver's braking demand. This usually works in tandem with a spring adapted to provide the driver with a degree of mechanical feedback indicative of the magnitude of the applied demand. Such an arrangement is shown in EP-A-0 195 579.

The arrangement disclosed in EP-A-0 195 579 incorporates a mechanism by which the driver is able to generate a braking demand signal for use by the EBS system. In such an arrangement the overriding intention is to provide such a demand signal at the expense of any improvement in driver feel or comfort. As a result the "feel" of the pedal and associated system is generally unsatisfactory.

A good conventional hydraulic braking system is arranged to provide the driver with a comfortable pedal feel, action, and braking response. This "feel" comprises at least three distinct components, although any combination of two of these would also be effective. Firstly the driver feels a change in system stiffness as the demand or pedal displacement increases. Secondly, the driver feels damping in the pedal action as the pedal is moved progressively through its travel. Finally the driver experiences hysteresis in the response of the system as the pedal is applied and released. These three elements are, within a conventional system, generated by a combination of hydraulic restrictions and damping as well as actuator stiffness and built-in hysteresis.

According to our invention in a pedal assembly of the kind set forth feedback reaction means is provided so that feedback to the driver through the pedal provides a comfortable pedal feel.

For example, the pedal feel may be similar to that achieved in a conventional hydraulic braking system fitted to a non-EBS equipped vehicle.

Spring means and damping means may be built into the braking system in order to provide the driver with a comfortable pedal feel.

This can be achieved by a spring assembly in combination with a damper, for example an elastomeric reaction disc or an hydraulic damper, either incorporated in the spring assembly or comprising a rotary dashpot which may be fitted to the pivot pin for an angularly moveable lever carrying the foot pad.

The spring assembly may comprise a two-rate spring assembly or a variable rate spring assembly.

In a modification the EBS includes a hysteresis function.

In one construction this comprises a filter adapted to provide a fixed hysteresis value or a value adapted in dependence upon either the rate of change of the brake application, the magnitude of the brake application, or a combination of both.

The pedal assembly may be embodied in a pedal box which accommodates the feedback reaction means.

In another construction the pedal acts on the piston of an hydraulic master cylinder through a push-rod and a variable rate spring, and a linear displacement transducer is adapted to produce a signal to an ECU in response to displacement of the pedal in a brake applying direction.

In this construction the hydraulic master cylinder builds in hydraulic damping, and hysteresis, by virtue of it connecting to the pedal.

According to another aspect of our invention a pedal assembly of the kind set forth is adapted to provide two signal inputs for a main electronic control unit which, in turn, is adapted to service at least two sub-systems of a braking system.

The signals may be sensed through two potentiometers, either rotary or linear in construction.

When the potentiometers are of the rotary type, they may be connected to the pedal through a ratio arm. Hence pedal travel in the form of pedal rotation is sensed.

Some embodiments of our invention are illustrated in the accompanying drawings in which.

Figure 1:
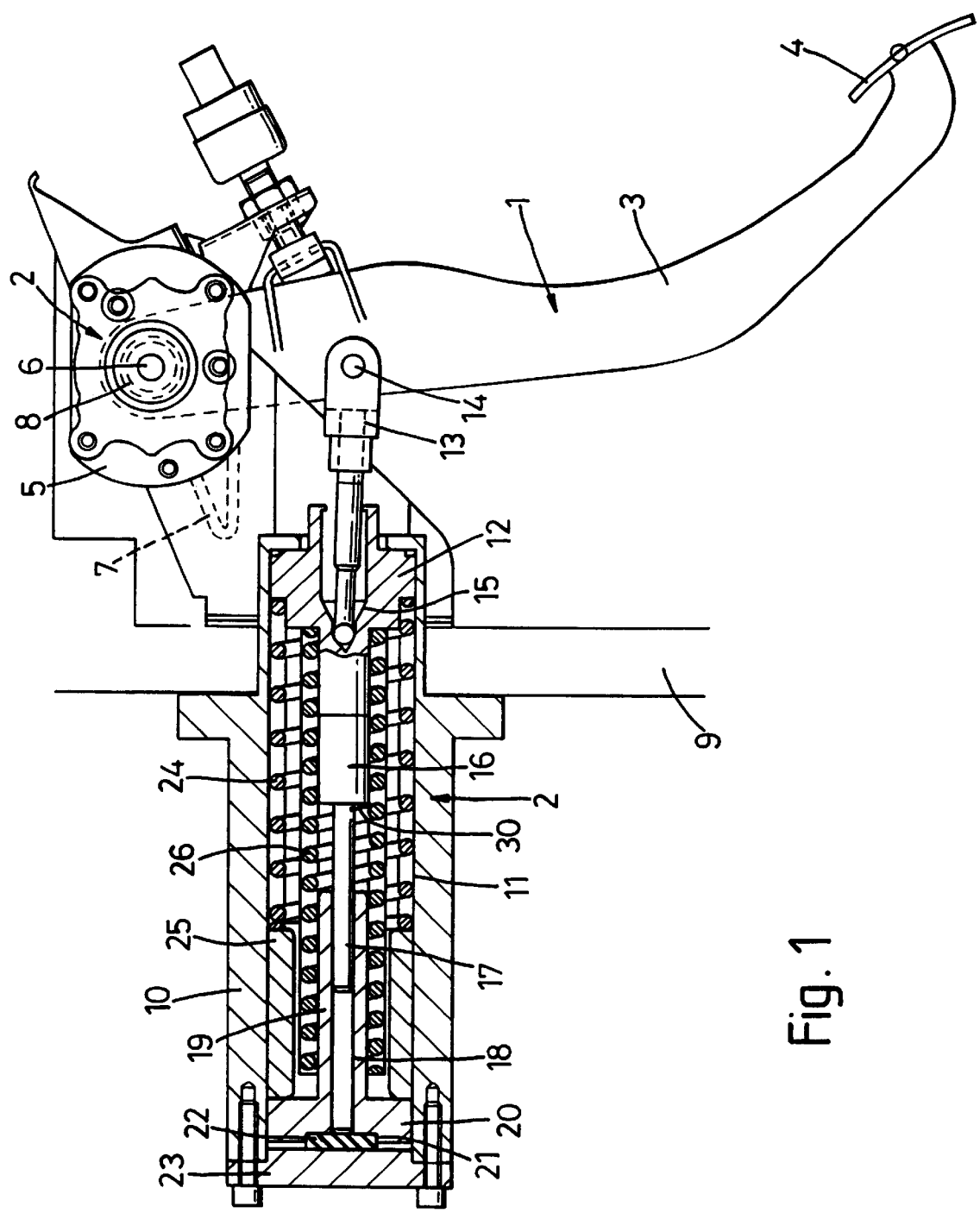
FIG. 1 is a side elevation of a pedal assembly for an EBS including a longitudinal section through a pedal box.

The pedal assembly 1 illustrated in FIG. 1 of the accompanying drawings comprises a pedal box 2. The pedal box comprises a lever 3 having a foot pedal 4 at its lower end and being carried at its upper end from a bracket 5 through a pivot pin 6 about which the lever 3 is angularly moveable against the force in a return leaf spring 7. Angular movement of the lever 3 operates a rotary potentiometer 8 for actuating an EBS.

The bracket is mounted on one side of a bulkhead 9 of the vehicle, and a housing 10 projecting into the engine compartment is secured to the opposite side of the bulkhead 9, extending rearwardly through the bulkhead 9 towards the lever 3. The housing has a longitudinally extending bore 11 in the end of which adjacent to the pedal 1 works a short piston 12 upon which the pedal 1 acts through a rocking strut 13. The strut 13 is connected to the pedal lever 3 through a pivot pin 14 and has a rocking engagement at its opposite end with the base of a recess 15 in the piston 12. The piston 12 carries a forwardly extending piston rod 16 of stepped outline of which a distal portion 17 of smaller diameter works in a bore 18 of a cylindrical extension 19 of a circular fitting 20. The fitting 20 is provided in the face remote from the extension 19 with a circular recess 21 which receives a disc 22 of elastomeric material and which is clamped against a wall 23 at the adjacent outer end of the housing 10 by the force in a compression spring 24 acting between the piston 11 and the fitting 20 through a sleeve 25.

A second compression spring 26 of a higher rate than the spring 24 surrounds the cylindrical extension 19 and a portion of the rod 16 which is of greater diameter. When the piston 11 is fully retracted, the compression spring is unstressed and is spaced from the fitting 20.

In operation, initial angular movement of the pedal lever 3 in a brake-applying direction is opposed by the force in the outer, lower rate, spring 24. This increases progressively and the magnitude of the "feedback" or "feel" increases in a second range of movement when the higher rate inner spring 26 "bottoms" against the fitting 20, whereafter, upon further movement in the same direction, the magnitude of "feel" is increased, not only by further compression of the spring 24 but by compression of the inner spring 26. This continues until a shoulder 30 at the step in diameter between the portions 16 and 17 of the rod engages with the extension 19 to define the stop. However, due to the presence of the disc 22, a solid "feel" is prevented by movement of the fitting 20 towards the end wall 23. In practice it is unusual for the shoulder 30 to contact the extension 19.

Figure 2:
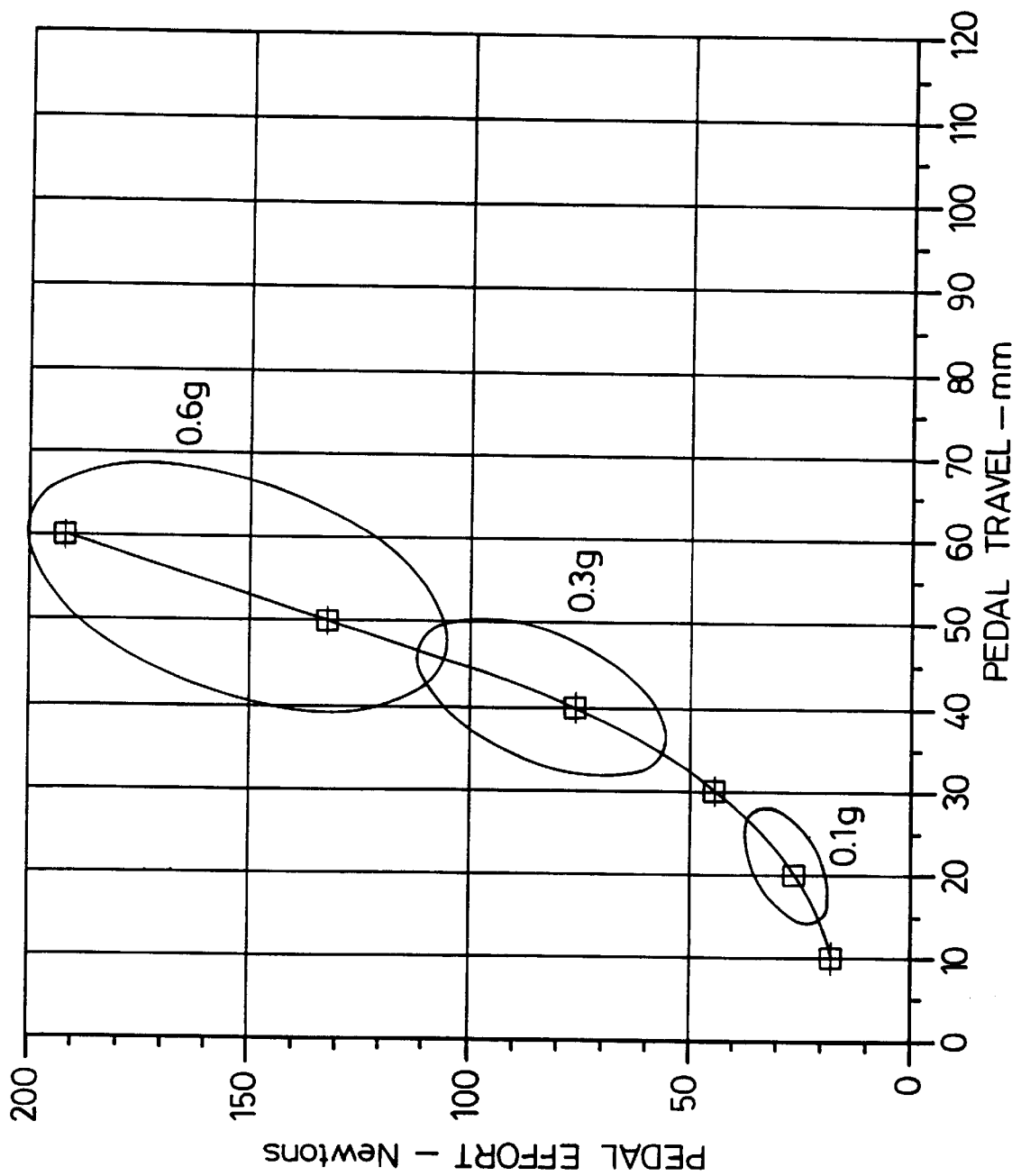
FIG. 2 is a graph showing the relationship between pedal travel and pedal effort.

The relationship between pedal travel and pedal feel, known as pedal stiffness, is illustrated in the graph of FIG. 2 of the accompanying drawings.

In a modification of the construction of FIG. 1, the coil compression springs 24 and 26 can be replaced by wrap springs of different rates arranged to surround the pivot pin 6. Such an arrangement is particularly useful where space is at a premium.

Figure 3:
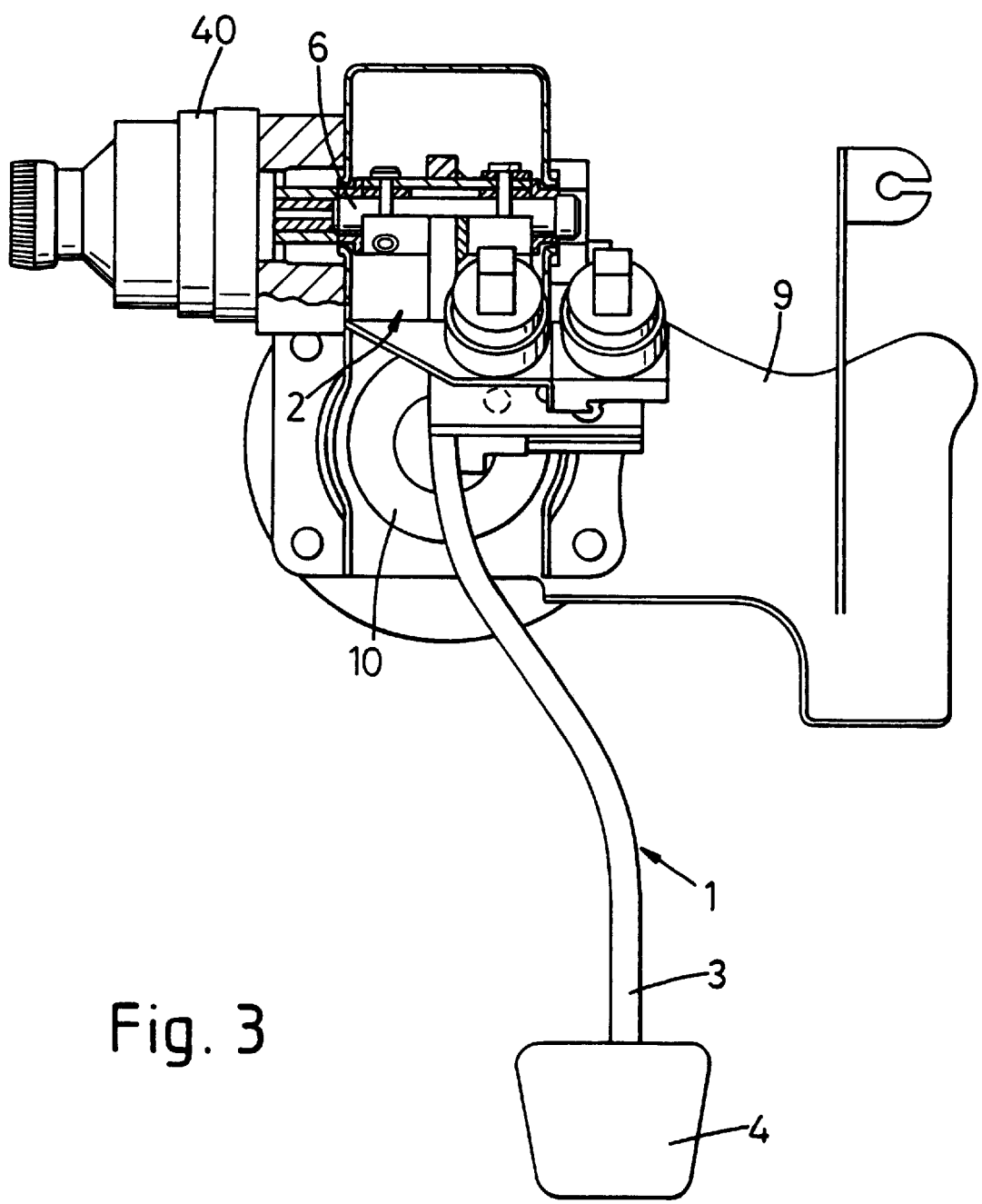
FIG. 3 is an end view of another pedal assembly including a rotary dashpot or damper.

In the pedal box 2 illustrated in FIG. 3 of the accompanying drawings, a rotary dashpot or damper 40 is connected to the pivot pin 6 of the pedal lever 3, so that the damper is adapted to damp movement of the pedal lever in at least a downward or brake-applying direction.

Preferably the amount of damping is fixed at the suitable level but optionally the damping level could be made to vary in accordance with either the speed of application or the magnitude of application of the brake pedal. For most installations there would only be a requirement for any significant damping of the pedal action in a brake-applying direction, but it could be foreseen that some level of damping would be required in the "brakes off" position, preventing a too rapid brake pedal release.

The construction and operation of the pedal box of FIG. 3 is otherwise the same as that of FIG. 1, and corresponding reference numerals have been applied to corresponding parts.

Figure 4:
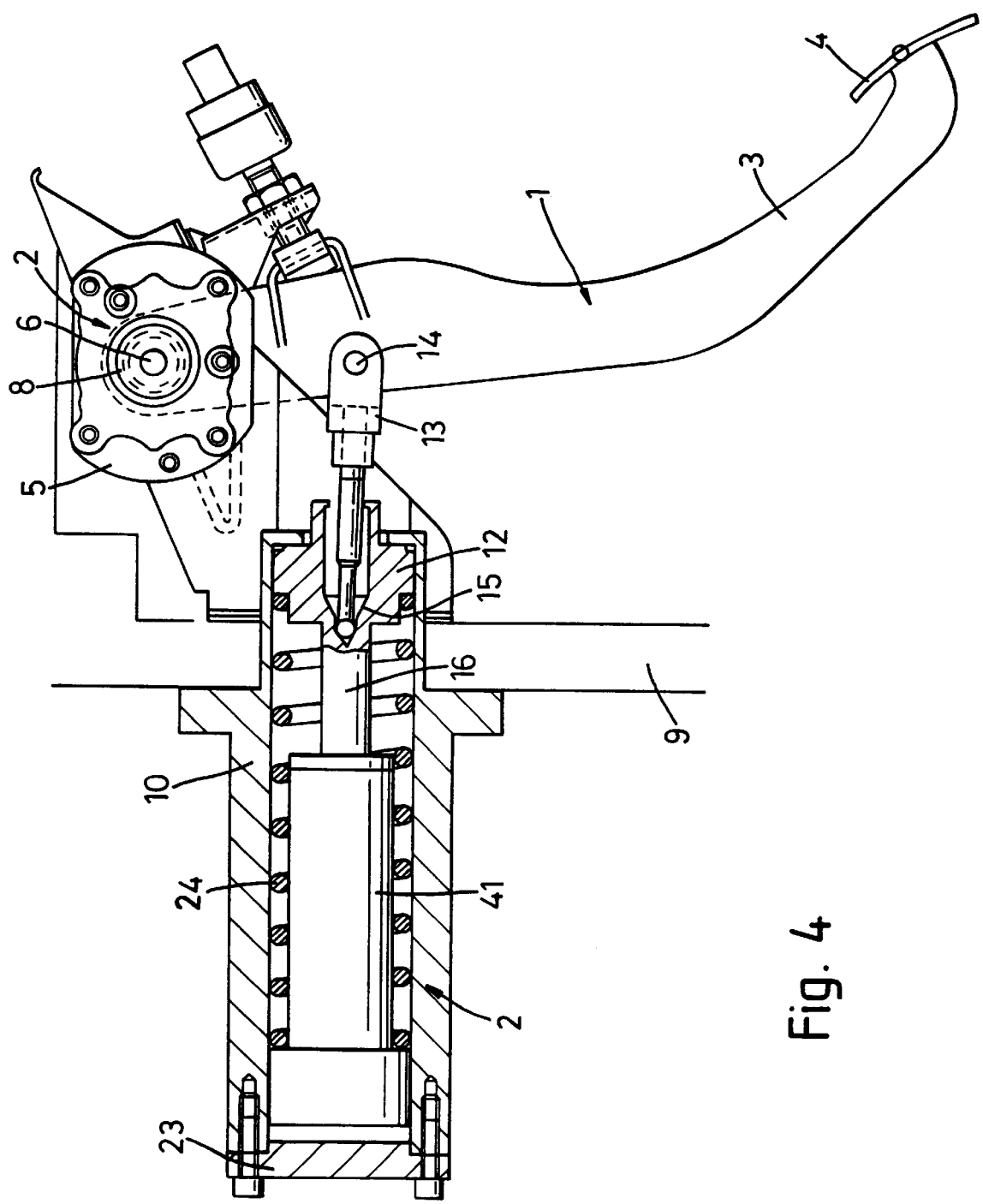
FIG. 4 is a side elevation similar to FIG. 1 but showing a modified construction.

In the pedal box illustrated in FIG. 4 of the accompanying drawings, the inner spring 26 is omitted The piston rod 16 is shortened and is adapted to operate a conventional damper 41 including a spring and a liquid filled cylinder of the dashpot type.

By choice of the correct rate for the spring 24, and in the spring of the damper, the correct stiffness profile can be obtained.

As in the previous modification, wrap springs could be combined with the rotary dashpot of FIG. 3.

Figure 5:
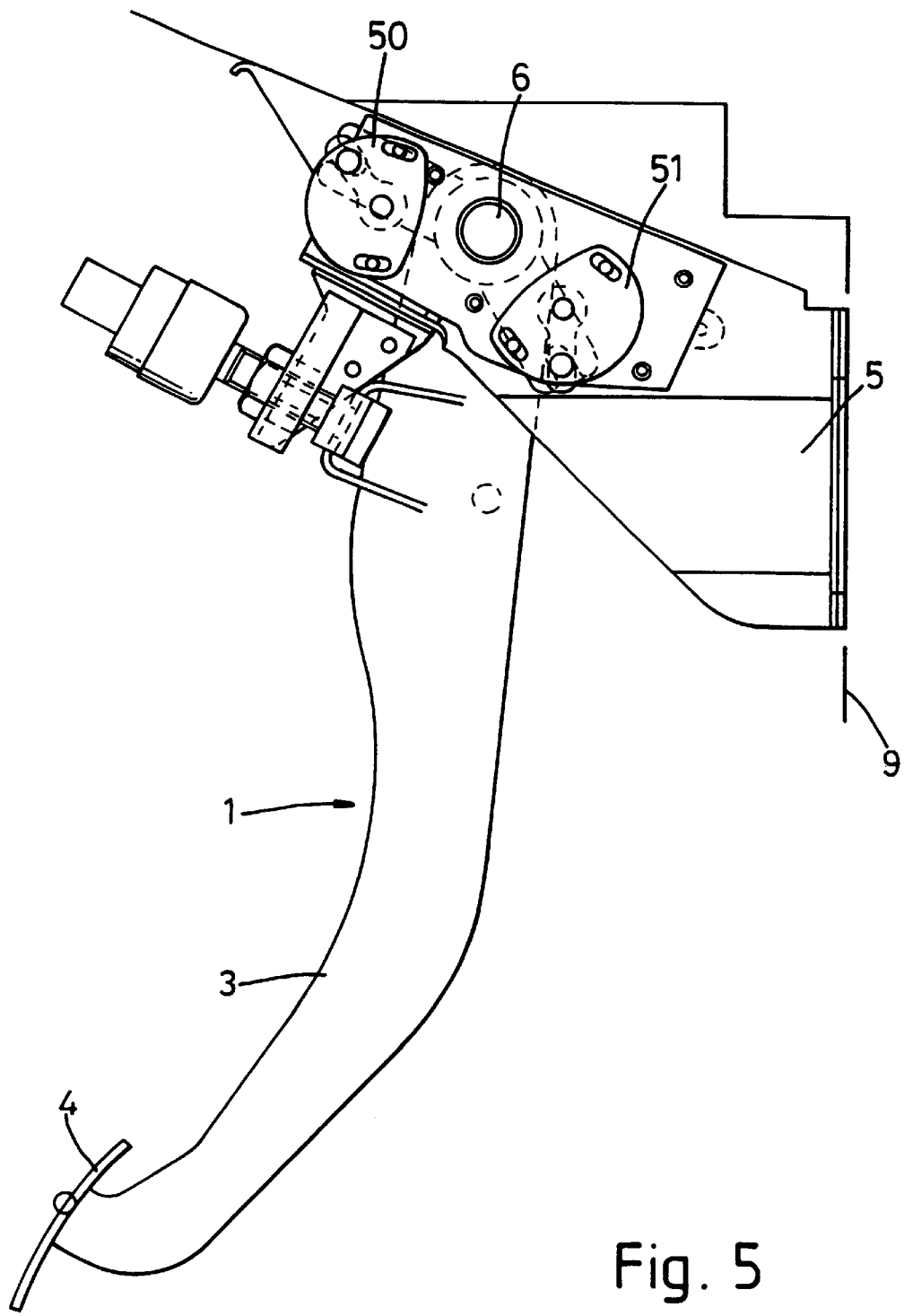
FIG. 5 illustrates another pedal assembly.

FIG. 5 of the accompanying drawings illustrates the installation with a pedal assembly of at least two rotary potentiometers 50,51 which act as sensors for providing the varying electrical signal indicative of the driver's braking demand. At least two sensors 50,51 are used to provide separate signals for each half of the braking system. Typically one sensor 50 provides signals to an ECU controlling one of at least two sub-systems of a braking system, and the other sensor 51 provides signals to the ECU for another sub-system of the braking system. In one example the ECU is adapted to service two-channels of an X-split braking system. In normal operation the two halves remain totally independent, but it could be foreseen that conventional redundancy techniques could be used where applicable.

In a modification the rotary potentiometers 50,51 could be replaced with linear potentiometers, to suit a particular installation.

The signals emanating from the sensor 52 are fed into an ECU which controls the application of the brakes.

Figure 6:
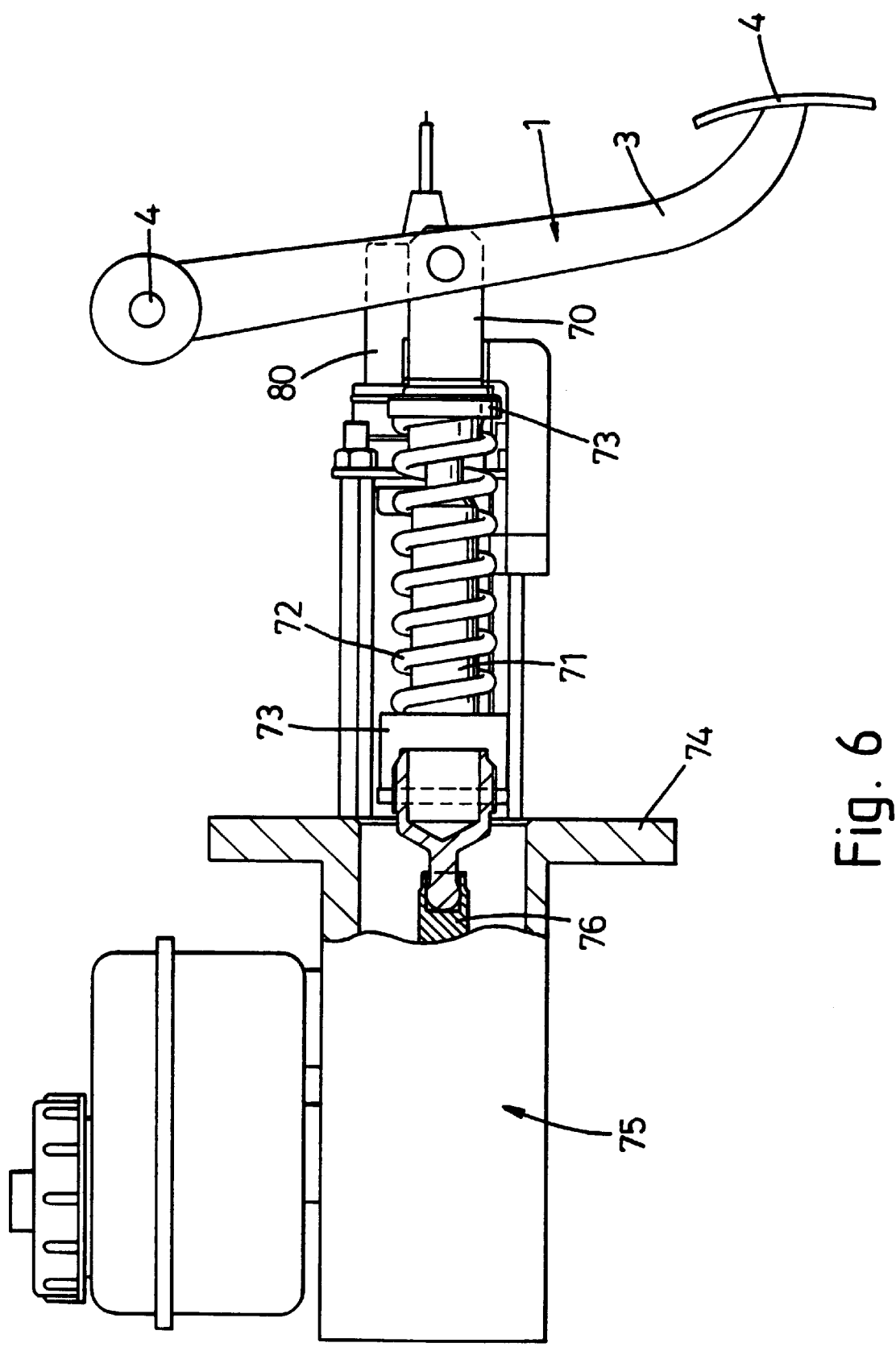
FIG. 6 is a side elevation of yet another pedal assembly for an EBS also adapted to operate an hydraulic master cylinder upon failure of the EBS.
Figure 7:
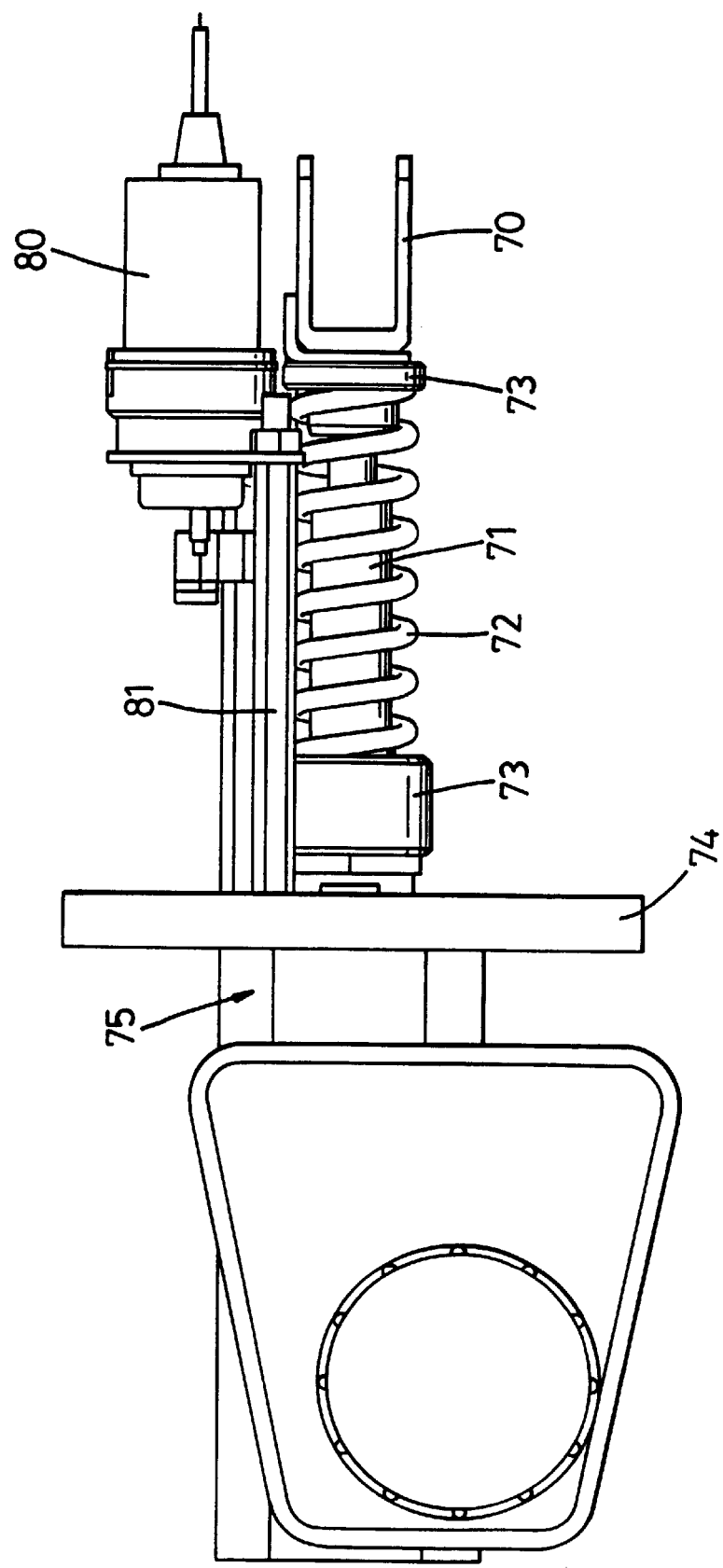
FIG. 7 is a plan of the pedal assembly of FIG. 6.

In the pedal assembly illustrated in FIGS. 6 and 7 of the accompanying drawings the pedal lever 3 is coupled through a clevis 70 to a push-rod 71. A variable rate spring 72 surrounds the push-rod 71 and abuts at opposite ends between a shoulder 72 on the rod and an abutment member 73 carried from the fixed body 74 of an hydraulic master cylinder 75. The push-rod 71 is operatively connected to the portion 76 of the master cylinder.

A single linear displacement transducer 80 carried from the body 74 by means of tie rods 81 is adapted to measure displacement of the pedal 1 to provide a signal to the ECU which controls the application of the brakes.

Since the push-rod 71 is operatively connected to the piston of the master cylinder 76 of the master cylinder 75, upon failure of the EBS, the brakes can be applied hydraulically by the master cylinder 75 in response to additional movement of the push-rod 71 in a brake-applying direction.

A typical system in which the pedal assembly of FIGS. 6 and 7 may be incorporated from the subject of our GB Patent Application No. 9420149.8.

The provision of the hydraulic master cylinder to provide hydraulic back-up enables us to simply the electrical control system is as much as on a single sensor comprising the single transducer so need be provided.

The embodiment of FIGS. 6 and 7 therefore incorporates a variable rate spring 72, and the hydraulic master cylinder 75 builds in hydraulic damping, and hysteresis, by virtue of its connection to the pedal lever 3.

Figure 8:
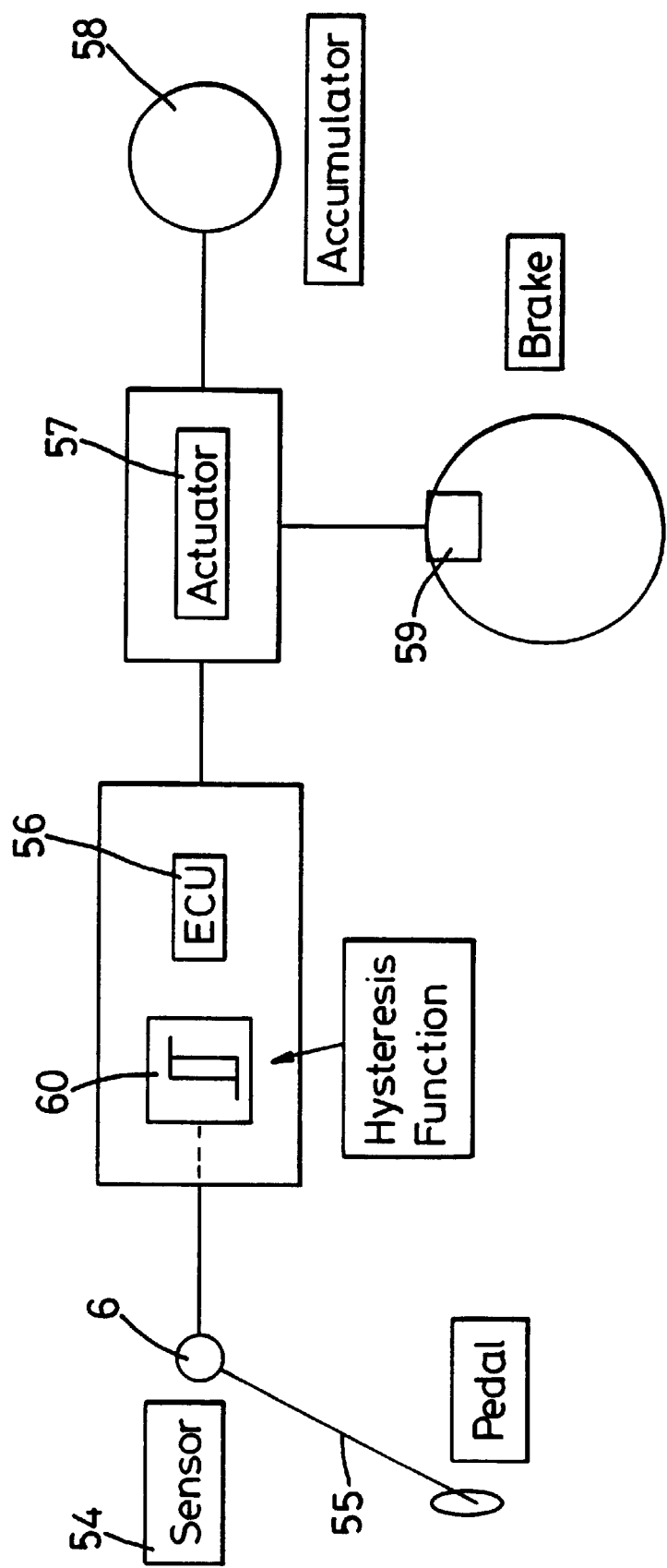
FIG. 8 is a layout of an EBS including an electronic hysteresis function.

An EBS is illustrated in the layout of FIG. 8 of the accompanying drawings.

As illustrated in FIG. 8 signals from a sensor 54 sensing movement of a pedal assembly 55 are fed into an ECU 56 for controlling application of the brakes. Specifically an energising current from the ECU 56 actuates a solenoid-operated actuator 57 in turn for regulating the flow of hydraulic fluid under pressure from an hydraulic actuator 58 to a brake 59.

The circuit includes software hysteresis 60 in the form of a filter arrangement which provides either a fixed hysteresis value or a value adapted in dependence upon either the rate of change of application of the brakes or the magnitude of application or a combination of both. A similar, in-built, hysteresis effect can be achieved by suitable selection of springs and damper as described above with reference to the preceding embodiments. However it is envisaged that it would be more effective from both the performance and cost point of view to build in the value of hysteresis electronically.

The pedal assembly 55 is incorporated into a pedal box having a two-rate spring assembly, or a variable rate spring assembly, or a spring and damper combination as described above with reference to FIGS. 1, 3, 4 and 5, 6 and 7 of the accompanying drawings.

In the present invention we provide a good conventional pedal feel for the driver, which improves comfort and therefore driver satisfaction. Where the software hysteresis is concerned, we are able to tune the pedal feel to both the requirements of the vehicle, and of the driver. The tuning or the system for comfort is seen as a one off per installation but again where software or electronic control is employed the system can adapt to understand the driver's driving technique and compensate for any irregularities in order to maintain a good feel.

What is claimed is:

1. A pedal assembly for a brake-by-wire vehicle braking system in which an operation of a brake pedal causes an actuation of the brakes of a vehicle, said pedal assembly comprising a hydraulic cylinder having a piston, a push-rod and a single variable rate spring, a pedal for activating said piston through said push-rod and variable rate spring, and a linear displacement transducer means for producing a signal to an electronic control unit in response to a displacement of said pedal in a brake applying direction, and means associated with said pedal assembly to provide feedback with a hysteresis function to a driver operating said pedal.

2. The pedal assembly of claim 1 wherein the feedback means further comprises a filter in a circuit of said electronic control unit, said filter being selected from a group consisting of means for providing a fixed hysteresis value, for providing a value acting in dependence upon a rate of change of a brake application, a magnitude of the brake application, or a combination of both said rate and said magnitude.

3. The pedal assembly of claim 1 further comprising a pedal-box including said pedal assembly and the feedback reaction means.

4. An electronic braking system of a brake by wire type for a vehicle incorporating a pedal assembly comprising an hydraulic cylinder having a piston, a push-rod and a single variable rate spring, a pedal for activating said push-rod and said variable rate spring, and a linear displacement transducer for producing a signal to an electronic control unit in response to a displacement of said pedal in a brake applying direction, and means associated with said pedal assembly to provide feedback with a hysteresis function to a driver operating said pedal.

* * * * *